United States Patent [19]
Sonobe et al.

[11] Patent Number: 5,741,472
[45] Date of Patent: Apr. 21, 1998

[54] CARBONACEOUS ELECTRODE MATERIAL FOR SECONDARY BATTERY

[75] Inventors: Naohiro Sonobe; Jiro Masuko; Takao Iwasaki, all of Iwaki, Japan

[73] Assignee: Kureha Kagaku Kogyo Kabushiki Kaisha, Tokyo, Japan

[21] Appl. No.: 518,357

[22] Filed: Aug. 23, 1995

[30] Foreign Application Priority Data

Aug. 23, 1994 [JP] Japan ................................. 6-219636

[51] Int. Cl.$^6$ ................................................ C09C 1/56
[52] U.S. Cl. .................. 423/460; 423/445 R; 423/447.9; 423/448; 429/218; 429/122
[58] Field of Search ........................... 429/218, 122; 423/445 R, 447.9, 448, 460

[56] References Cited

U.S. PATENT DOCUMENTS

| | | | |
|---|---|---|---|
| 4,628,001 | 12/1986 | Saskai et al. | 423/447.1 |
| 4,671,907 | 6/1987 | Iwahashi et al. | 423/445 R |
| 5,401,598 | 3/1995 | Miyabayashi et al. | 429/218 |
| 5,527,643 | 6/1996 | Sonobe et al. | 429/218 |
| 5,536,597 | 7/1996 | Takahashi et al. | 429/218 |
| 5,540,903 | 7/1996 | Romine | 423/445 R |

*Primary Examiner*—Bruce F. Bell
*Attorney, Agent, or Firm*—Wenderoth, Lind & Ponack

[57] ABSTRACT

A carbonaceous electrode having improved capacities for doping and dedoping of a cell active substance, such as lithium, and suitable for a non-aqueous solvent-type secondary battery, is constituted by a carbonaceous material having a specific microtexture. The carbonaceous material is characterized by an average (002)-plane spacing of at least 0.365 nm according to X-ray diffraction method, and also a ratio $\rho_H/\rho_B$ of at least 1.15 wherein $\rho_H$ denotes a density measured by using helium gas as a substitution medium and $\rho_B$ denotes a density measured by using butanol as a substitution medium.

11 Claims, 1 Drawing Sheet

CARBONACEOUS ELECTRODE MATERIAL FOR SECONDARY BATTERY

FIELD OF THE INVENTION AND RELATED ART

The present invention relates to a carbonaceous electrode material for a secondary battery, and more particularly to a carbonaceous material suitable as an electrode material for a high-energy density non-aqueous solvent-type secondary battery because of a high effective utilization rate represented by a large doping-dedoping capacity of a cell active substance and an excellent charge-discharge cycle characteristic. The present invention also relates to a process for producing such a carbonaceous electrode material, an electrode structure comprising such a carbonaceous electrode material, and a non-aqueous solvent-type secondary battery having such an electrode structure.

There has been proposed a non-aqueous solvent-type lithium (Li) secondary battery having a negative electrode comprising a carbonaceous material as a secondary battery of a high energy density (e.g., in Japanese Laid-Open Patent Application (JP-A) 57-208079, JP-A 62-90863, JP-A 62-122066 and JP-A 2-66856). This is based on utilization of a phenomenon that a carbon intercalation compound of lithium can be easily formed electrochemically. The battery comprises a negative electrode of such a carbonaceous material and a positive electrode of a lithium chalcogenide, such as $LiCoO_2$. When the battery (cell) is charged, lithium ions are released from the positive electrode, flow to the negative electrode and dope (i.e., are intercalated between layers of) the carbon of the negative electrode. The carbon thus doped with lithium functions as a lithium electrode. During the discharge, the lithium ions are de-doped (released) from the carbon negative electrode and return to the positive electrode.

In such a carbonaceous material as a negative electrode material or also a carbonaceous material as a positive electrode material which is doped with a lithium source, an amount of electricity stored per unit weight of the carbonaceous material is determined by the de-doped amount of lithium so that it is desired for a carbonaceous material constituting an electrode material to have a large lithium-dedoping capacity.

A conventional carbonaceous material obtained by calcining phenolic resin or furan resin has been known to have a large lithium-doping capacity and is desirable from this viewpoint. However, in case where such a carbonaceous material obtained by calcining phenolic resin or furan resin is used to constitute a negative electrode, lithium doping the negative electrode carbon is not completely de-doped but a large amount of lithium can remain in the negative electrode carbon, so that the active substance lithium is liable to be wasted.

On the other hand, in case where graphite or a carbonaceous material having a developed graphite structure as another known carbonaceous material is used to constitute an electrode, a graphite intercalation compound is formed to provide an expanded graphite layer spacing by doping such a graphitic material constituting the electrode with lithium. When the interlayer-doping lithium is de-doped (i.e., released), the graphite layer spacing is restored to the original value. Accordingly, a graphite crystalline structure is liable to be broken when subjected to repetition of doping-dedoping cycles. As a result, a secondary battery constituted by using such a graphitic material is known to have an inferior charge-discharge cycle characteristic. Further, a battery using such a graphitic material is also known to involve a problem that the electrolytic solution is liable to be decomposed in operation of the battery.

SUMMARY OF THE INVENTION

An object of the present invention, which has been accomplished to solve the above-mentioned problems, is to provide a carbonaceous electrode material for a secondary battery, which has a large charge-discharge capacity and a small irreversible capacity as determined by a difference between a doping capacity and a dedoping capacity, thus providing a non-aqueous solvent-type secondary battery capable of effectively utilizing an active substance.

Another object of the present invention is to provide a process for producing such a carbonaceous material as described above, an electrode structure by using such a carbonaceous material, and also a non-aqueous solvent-type secondary battery including such an electrode structure.

According to our study, it has been found possible to provide a carbonaceous material capable of providing a non-aqueous solvent-type secondary battery having a large charge-discharge capacity, an excellent charge-discharge cycle characteristic and a small irreversible capacity (large active substance-utilization rate) by properly controlling the crystalline structure and microtexture of the carbonaceous material.

More specifically, according to the present invention, there is provided a carbonaceous electrode material for a non-aqueous solvent-type secondary battery, comprising a carbonaceous material having an average (002)-plane spacing (hereinafter sometimes denoted by "$d_{002}$") of at least 0.365 nm according to X-ray diffraction method and characterized by a ratio $\rho_H/\rho_B$ of at least 1.15 wherein $\rho_H$ denotes a density measured by using helium gas as a substitution medium and $\rho_B$ denotes a density measured by using butanol as a substitution medium.

A carbonaceous material having the above-described properties may be produced by a process including the steps of:

mixing a pitch of a petroleum or coal origin with an additive comprising an aromatic compound having two or three aromatic rings and a boiling point of at least 200° C. to form a shaped pitch product, extracting the additive from the shaped pitch product with a solvent showing a low dissolving power to the pitch and a high dissolving power to the additive, thereby to leave a porous pitch product, oxidizing the porous pitch product, and calcining the oxidized porous pitch product at a temperature of 900°–1500° C. under a reduced pressure of at most 10 kPa (ca. 0.1 atm).

In the above-described process according to the present invention, when an additive, such as naphthalene, is removed by extraction from the resultant shaped pitch product, fine pores are produced in the pitch product, thereby making the pitch product porous. The resultant porous pitch is oxidized to be heat-infusible and then calcined, whereby the pitch can be converted into the carbonaceous material while retaining the fine pores therein. By further effecting the calcination under a reduced pressure, it is possible to facilitate the dissipation of decomposition gas and tar produced during the calcination to promote the formation of fine pores. The thus-produced carbonaceous material is rich in open pores (intrudable by helium) to provide a large $\rho_H$ and also a large $\rho_H/\rho_B$. The carbonaceous material according to the present invention shows a lithium-doping capacity which is much larger than a value calculated by a lithium graphite intercalation compound $LiC_6$. Accordingly, in the carbonaceous material according to the present invention, the lithium contained in the carbon by doping can be present therein also in a form other than the graphite intercalation compound. It is assumed that the doping and dedoping of lithium in the state other than the graphite intercalation compound is attributable to open pores having a size into which helium can intrude but butanol cannot.

According to another aspect of the present invention, there is provided an electrode structure for a non-aqueous solvent-type secondary battery, comprising: an electroconductive substrate and a composite electrode layer disposed on at least one surface of the electroconductive substrate; the composite electrode layer comprising a carbonaceous electrode material as described above in a particulate form, and a binder.

According to a further aspect of the present invention, there is provided a non-aqueous solvent-type secondary battery, comprising, a positive electrode, a negative electrode, and a separator and a non-aqueous electrolytic solution disposed between the positive and negative electrodes; at least one of the positive and negative electrodes comprising an electrode structure as described above.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
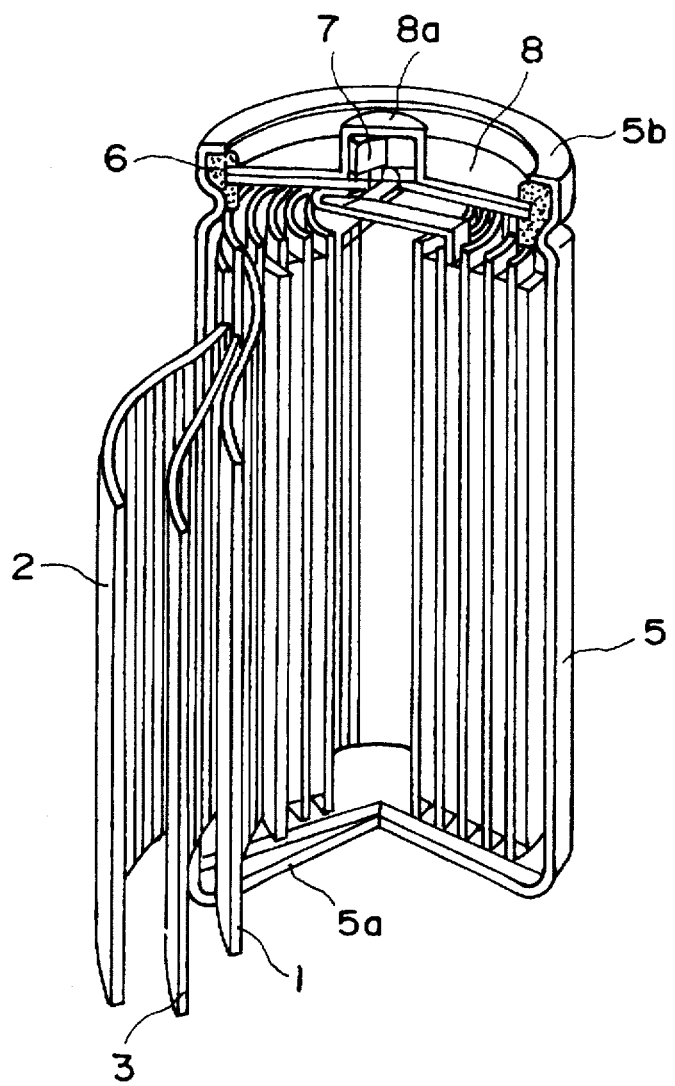
FIG. 1 is a partially exploded perspective view of a non-aqueous solvent-type secondary battery which can be constituted according to the invention.

A first characteristic to be satisfied by the carbonaceous material according to the present invention is that it has an average (002) plane-spacing, i.e., an average spacing between (002) planes as measured according to X-ray diffraction analysis (hereinafter denoted by "$d_{002}$"), of at least 0.365 nm. If a negative electrode for a non-aqueous solvent-type secondary battery is constituted by a carbonaceous material having $d_{002}$ below 0.365 nm, the electrode can have only a small doping capacity for a cell active substance and is also liable to cause decomposition of the electrolytic solution. The spacing $d_{002}$ may preferably be 0.370–0.395 nm, further preferably 0.375–0.390 nm.

A second characteristic of the carbonaceous material according to the present invention is that it shows a ratio $\rho_H/\rho_B$ of at least 1.15 wherein $\rho_H$ denotes a density measured by using helium gas as a substitution medium and $\rho_B$ denotes a density measured by using butanol as a substitution medium.

The value of $\rho_H/\rho_B$ is an index of porous structure in a carbonaceous material. A larger value thereof means a larger proportion of pores in a size into which helium can intrude but butanol cannot, i.e., the presence of many fine pores. On the other hand, the $\rho_H/\rho_B$ ratio is decreased when closed pores into which even helium cannot intrude are present in a large proportion.

A carbonaceous material having $\rho_H/\rho_B$ of below 1.15 is not desired because of small capacities for doping and dedoping of a cell active substance. The $\rho_H/\rho_B$ ratio may preferably be at least 1.20, further preferably at least 1.25.

In addition to the above-mentioned characteristics, the carbonaceous material according to the present invention may preferably further satisfy the following characteristics.

One of such preferred characteristics is that it shows a hydrogen/carbon atomic ratio H/C (hereinafter sometimes simply denoted by "H/C ratio") of at most 0.1. A carbonaceous material is generally caused to have a smaller H/C ratio as the final heat treatment temperature during the production thereof is elevated. A carbonaceous material having an H/C ratio exceeding 0.1 is not desirable because it is liable to cause an increase in irreversible capacity which is calculated as a difference between the doping capacity and de-doping capacity of an active substance. The H/C ratio may preferably be at most 0.08, further preferably at most 0.06.

The carbonaceous material according to the present invention may further preferably have a crystallite size in c-axis direction as measured by X-ray diffraction method (hereinafter sometimes denoted by "$L_{c(002)}$") of at most 15 nm. Carbonaceous materials may be roughly classified into graphitizable carbonaceous materials and nongraphitizable carbonaceous materials. When subjected to a heat treatment at a high temperature (of, e.g., 2800° C. or higher), a graphitizable carbonaceous material is caused to have a developed crystalline structure to show $d_{002}$ and $L_{c(002)}$ which decreases and increases, respectively, to approach the values of graphite. On the other hand, a nongraphitizable carbonaceous material does not remarkably develop a crystalline structure even when subjected to a high heat treatment temperature. The carbonaceous material according to the present invention may be classified as a nongraphitizable carbonaceous material and may have $L_{c(002)}$ of at most 15 nm, preferably at most 10 nm, further preferably at most 5 nm.

It is further preferred that the carbonaceous material according to the present invention shows $\rho_B$ of at most 1.70 g/cm$^3$. For a carbonaceous material having identical $d_{002}$ and identical $L_{c(002)}$, a smaller $\rho_B$ means the presence of a larger proportion of fine pores. $\rho_B$ may be at most 1.70 g/cm$^3$, preferably 1.65 g/cm$^3$, further preferably at most 1.60 g/cm$^3$.

The carbonaceous material according to the present invention may for example be produced through a process as described below.

A pitch, such as petroleum pitch or coal pitch, is melt-mixed under heating with an additive comprising an aromatic compound having a boiling point of at least 200° C. and having generally two or three aromatic rings or a mixture of such aromatic compounds to form a shaped pitch product. Then, the additive is removed from the pitch product by extraction with a solvent having a low dissolving power for the pitch and a high dissolving power for the additive to form a porous pitch, which is then oxidized and calcined under a reduced pressure of at most 10 kPa at a temperature of 900°–1500° C. to obtain a carbonaceous material according to the present invention.

The above-mentioned aromatic additive is added for the purpose of converting the shaped pitch product into a porous material through removal by extraction of the additive so as to control the microstructure of the resultant carbonaceous material and facilitate the oxidation and calcination of the carbonaceous material in the subsequent steps. Such an additive may more specifically be selected as a single species or a mixture of two or more species selected from, e.g., naphthalene, methylnaphthalene, phenylnaphthalene, benzylnaphthalene, methylanthracene, phenanthrene, and biphenyl. The additive may preferably be added in a proportion of 30–70 wt. parts per 100 wt. parts of the pitch.

The mixing of the pitch and the additive may suitably be performed in a molten state under heating in order to achieve uniform mixing. The resultant mixture of the pitch and additive may preferably be shaped into particles of at most 1 mm in diameter so as to facilitate the extraction of the additive from the mixture. The shaping may be performed in a molten state or by pulverization of the mixture after cooling.

Suitable examples of the solvent for removal by extraction of the additive from the mixture of the pitch and the additive may include: aliphatic hydrocarbons, such as butane, pentane, hexane and heptane; mixtures principally comprising aliphatic hydrocarbons, such as naphtha and kerosene; and aliphatic alcohols, such as methanol, ethanol, propanol and butanol.

By extracting the additive from the shaped mixture product with such a solvent, it is possible to remove the additive from the shaped product while retaining the shape of the product. At this time, it is assumed that pores are formed at sites from which the additive is removed, thereby providing a uniformly porous pitch product.

The thus-obtained porous pitch product is then oxidized. The oxidation may preferably be performed at a temperature of from room temperature to 400° C. by using an oxidizing agent. Examples of the oxidizing agent may include: oxidizing gases, such as $O_2$, $O_3$, $SO_3$, $NO_2$, mixture gases formed by these gases diluted with, e.g., air or nitrogen, and air; and oxidizing liquids, such as sulfuric acid, phosphoric acid, nitric acid, and hydrogen peroxide aqueous solution.

The oxidation of the porous pitch may conveniently be performed by using an oxygen-containing gas, such as air or a gaseous mixture of air with another gas such as combustion gas, at 120°–300° C. This is also economically advantageous. In this instance, if the pitch has a low softening point, the oxidation is liable to be difficult due to melting of the pitch during the oxidation, so that it is preferred to use a pitch having a softening point of at least 150° C.

In the case of oxidation using an oxygen-containing gas, for example, the oxidation may be caused to proceed to such a degree that the resultant oxidized porous pitch will have an oxygen content by elementary analysis of 5–30% as a measure. The oxygen content may preferably be 10–25%, further preferably 13–22%.

In the process according to the present invention, a heat treatment in which the resultant carbonaceous material experiences the highest temperature, is referred to as main calcination. The main calcination may be performed by treating the oxidized porous pitch at a temperature of 900°–1500° C. under a reduced pressure of at most 10 kPa (at most 0.1 atm). In order to prevent the oxidation of the product during the calcination, the calcination may preferably be performed in a reduced pressure atmosphere which does not contain an oxidizing gas such as oxygen but is allowed to contain only an inert gas, such as nitrogen or argon. A pressure under a reduced pressure exceeding 10 kPa results in insufficient removal of decomposition gas from the calcination product and thus insufficient formation of fine pores. The pressure may preferably be at most 1 kPa, further preferably at most 0.1 kPa. A main calcination temperature of below 900° C. is not preferred because the carbonization of the product is liable to be insufficient and the resultant carbonaceous material, when used as an electrode material for a secondary battery, is liable to provide a large irreversible capacity, i.e., a large amount of a cell active substance remains in the carbonaceous material. A main calcination temperature above 1500° C. is not preferred because it is liable to provide a carbonaceous material showing a low H and a low doping capacity for a cell active substance. The main calcination may preferably be performed at 950°–1450° C., further preferably 1000°–1400° C.

The calcination can be performed by heating the oxidized pitch continuously to a final calcination temperature (900°–1500° C.) or can be performed as a sequence of a pre-calcination at a temperature lower than such a final calcination temperature followed by a main calcination at such a final calcination temperature.

In a case where a carbonaceous material in the form of fine powder is required, the carbonaceous material obtained after the main calcination may be pulverized. Alternatively, it is also possible to adopt a process sequence wherein, preceding the main calcination, the oxidized pitch is pre-calcined at 350°–700° C. in an inert gas atmosphere (of, e.g., nitrogen or argon or under a reduced pressure) to provide a carbon precursor having a volatile (matter) content (as measured by a method described hereinafter) of at most 15%, the carbon precursor is pulverized to an average particle size of at most 100 μm, preferably at most 50 μm, and then the pulverized product is subjected to the main calcination, to produce a powdery carbonaceous material.

The volatile content in the carbon precursor is decreased to at most 15% in order to prevent the melting of or melt-sticking between pulverized particles during the calcination. The volatile content in the carbon precursor should preferably be lowered to at most 10%.

The carbon precursor before the main calcination can be very easily pulverized with less wearing of the pulverizer compared with the product after the main calcination, so that the process including the pulverization of a carbon precursor before the main calcination is very advantageous. The reduction of volatile content in the carbon precursor also reduces the quantity of tar and decomposition gas evolved in the main calcination step and reduces the load of the main calcination step, thus being preferred.

The carbonaceous material according to the present invention can also be prepared by calcining coconut shell char at a temperature of 900°–1500° C. under a reduced pressure of at most 10 kPa.

In the process according to the present invention, the calcination under a reduced pressure can be performed through the whole calcination step, but it is sufficient that only the calcination in a temperature region of 800° C. or above is performed under a reduced pressure.

FIG. 1 is a partially exploded perspective view of a lithium secondary battery as an embodiment of a non-aqueous solvent-type secondary battery according to the present invention.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polyethylene or polypropylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode. Further, the uppermost rim 5b of the casing 5 is crimped toward the inner side to form an entirely sealed cell structure enclosing the electricity-generating element.

Figure 2:
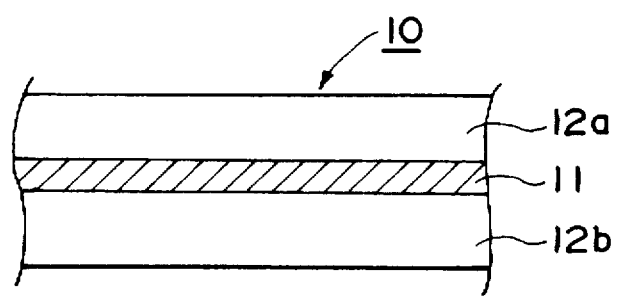
FIG. 2 is a partial sectional view of an electrode structure adopted in the secondary battery.

Herein, the positive electrode 1 or negative electrode 2 may be constituted by an electrode structure 10 having a sectional structure as partially shown in FIG. 2. More specifically, the electrode structure 10 includes an electroconductive substrate 11 comprising a foil or wire net of a metal, such as iron, stainless steel, steel, aluminum, nickel or titanium and having a thickness of, e.g., 5–100 μm, or 5–20 μm for a small-sized battery, and a composite electrode layer (12a, 12b) of, e.g., 10–1000 μm, preferably 10–200 μm, in thickness for a small-sized battery, on at least one surface, preferably on both surfaces as shown in FIG. 2, of the electroconductive substrate 11.

The composite electrode layers 12a and 12b are respectively a layer comprising a particulate carbonaceous material according to the present invention, an electroconductive material such as electroconductive carbon, optionally included, and a binder such as a vinylidene fluoride resin.

More specifically, in case of using the carbonaceous material according to the present invention for producing an electrode 10 (1 or 2) of a non-aqueous solvent-type secondary battery as described above, the carbonaceous material may be optionally formed into fine particles having an average particle size of 5–100 μm and then mixed with a binder stable against a non-aqueous solvent, such as polyvinylidene fluoride, polytetrafluoroethylene or polyethylene, to be applied onto an electroconductive substrate 11, such as a circular or rectangular metal plate, to form, e.g., a 10–200 μm thick layer. The binder may preferably be added in a proportion of 1–20 wt. % of the carbonaceous material. If the amount of the binder is excessive, the resultant electrode is liable to have too large an electric resistance and provide the battery with a large internal resistance. On the other hand, if the amount of the binder is too small, the adhesion of the carbonaceous material particles with each other and with the electroconductive substrate is liable to be insufficient. The conversion of the carbonaceous material into particles can also be performed at an intermediate stage of the carbonaceous material formation, such as before carbonization of the infusibilized pitch shaped body or after the preliminary carbonization. The above described formulation and values have been set forth with respect to production of a secondary battery of a relatively small capacity, whereas, for production of a secondary battery of a larger capacity, it is also possible to form the above-mentioned mixture of the carbonaceous material fine particles and the binder into a thicker shaped product, e.g., by press-forming, and electrically connect the shaped product to the electroconductive substrate.

The carbonaceous material of the present invention can also be used as a positive electrode material for a non-aqueous solvent-type secondary battery by utilizing its good doping characteristic but may preferably be used as a negative electrode material of a non-aqueous solvent-type secondary battery, particularly for constituting a negative electrode to be doped with lithium as an active substance of a lithium secondary battery.

In the latter case, the positive electrode material may comprise a complex metal chalcogenide, such as $LiCoO_2$, $LiNiO_2$ or $LiMnO_4$. Such a positive electrode material may be formed alone or in combination with an appropriate binder into a layer on an electroconductive substrate.

The non-aqueous solvent-type electrolytic solution used in combination with the positive electrode and the negative electrode described above may generally be formed by dissolving an electrolyte in a non-aqueous solvent. The non-aqueous solvent may comprise one or two or more species of organic solvents, such as propylene carbonate, ethylene carbonate, dimethyl carbonate, diethyl carbonate, dimethoxyethane, diethoxyethane, γ-butyrolactone, tetrahydrofuran, 2-methyl-tetrahydrofuran, sulfolane, and 1,3-dioxolane. Examples of the electrolyte may include $LiClO_4$, $LiPF_6$, $LiBF_4$, $LiCF_3SO_3$, $LiAsF_6$, $LiCl$, $LiBr$, $LiB(C_6H_5)_4$, and $LiN(SO_2CF_3)_2$.

As described above, a secondary battery of the present invention may generally be formed by disposing the above-formed positive electrode 1 and negative electrode 2 opposite to each other, optionally with a liquid-permeable separator 3 composed of, e.g., unwoven cloth or other porous materials, disposed therebetween, and dipping the positive and negative electrode layers together with an intermediate permeable separator in an electrolytic solution as described above.

Incidentally, the parameters $d_{002}$, $L_{c(002)}$, $\rho_B$, $\rho_H$, H/C, volatile content and softening point of pitch characterizing a carbonaceous material described herein are based on the measurement or tests performed in the following manners: [$d_{002}$ and $L_{c(002)}$ of carbonaceous material].

A powdery sample of a carbonaceous material is packed in an aluminum-made sample cell and is irradiated with monochromatic CuKα rays (wavelength λ=0.15418 nm) through a graphite monochromator to obtain an X-ray diffraction pattern according to a reflection-type defractometer method. The correction of a diffraction pattern is performed only with respect to corrections of $K\alpha_1$–$K\alpha_2$ doublet according to the Rachinger's method and without correction with respect to the Lorentz's polarization factor, absorption factor, atomic scattering factor, etc. The peak position of the diffraction pattern is determined by the center of gravity method (i.e., a method wherein the position of a gravity center of diffraction lines is obtained to determine a peak position as a 2θ value corresponding to the gravity center) and calibrated by the diffraction peak of (111) plane of high-purity silicon powder as the standard substance. The $d_{002}$ value is calculated from the Bragg's formula shown below.

$L_{c(002)}$ is calculated by the Scherrer's equation shown below based on a value $\beta_{1/2}$ obtained by using the Alexander curve from a full width at a half maximum intensity of the (002) diffraction peak of a sample carbonaceous material and a full width at a half maximum intensity of the (111) diffraction peak of the standard high-purity silicon powder substance. Herein, the shape factor K is set to 0.9.

$d_{002}=\lambda/(2.\sin\theta)$ (Bragg's formula)

$L_{c(002)}=(K.\lambda/(\beta_{1/2}.\cos\theta)$ (Scherrer's equation)

[$\rho_B$]

The true density of a carbonaceous material sample is measured pycnometrically with 1-butanol as a substitution medium according to a method prescribed in JIS R7212. The outline thereof is described hereinbelow.

A gravity bottle (pycnometer) having an inner volume of ca. 40 ml and equipped with a side pipe is accurately weighed (at $m_1$). At the bottom of the bottle, a sample is placed so as to provide a flat thickness of ca. 10 mm, and the total is weighed (at $m_2$). Then, 1-butanol is gently added thereto up to a depth of ca. 20 mm from the bottom. Then, a slight vibration is applied to the bottle to confirm that large bubbles have disappeared, and then the gravity bottle is placed in a vacuum desiccator, which is gradually evacuated to a pressure of 2.0–2.7 kPa. The pressure is maintained for at least 20 min. and, after termination of bubble occurrence, the gravity bottle is taken out. The bottle is further filled with 1-butanol, and a stopper is put thereon. The bottle is further immersed for at least 15 min. in a thermostat water vessel (controlled at 30±0.03° C.) to set the 1-butanol level at a standard line. Then, the bottle is taken out and the outer surface thereof is well wiped out to accurately weigh the bottle (at $m_4$).

Separately, the same gravity bottle is filled with only 1-butanol and immersed in the thermostat water vessel, followed by setting of the standard line and accurate weighing to provide a mass ($m_3$).

Further, the gravity bottle is separately filled with distilled water immediately after boiling to remove dissolved gas and similarly immersed in the thermostat water vessel, followed by setting of the standard line and accurate weighing to provide a mass ($m_5$).

$\rho_B$ is calculated from the following equation.

$$\rho_B=(m_2-m_1)(m_3-m_1)d/[(m_2-m_1-(m_4-m_3))(m_3-m_1)],$$

wherein d denotes a specific gravity (=0.9946) of water at 30° C.

[$\rho_H$]

$\rho_H$ is measured with respect to a sample after being dried at 120° C. for 2 hours by using a "Multi-Volume Pycnometer 1305" (trade name) available from Micromellitics Co. The environmental temperature during the measurement is made constant at 22° C. Each pressure used in the method is a gauge pressure obtained by subtracting an environmental pressure from an absolute pressure.

The measurement apparatus ("Multi-Volume Pycnometer 1305") includes a sample chamber equipped with a pressure gauge for measuring a pressure within the chamber, and an expansion chamber connected to the sample chamber via a connection pipe provided with a valve. A helium gas-introduction pipe provided with a stop valve is connected to the sample chamber, and a helium gas-discharge pipe provided with a stop valve is connected to the expansion chamber.

The measurement is performed in the following manner. The volume ($V_{CELL}$) of the sample chamber and the volume of the expansion chamber ($V_{EXP}$) are measured in advance by using a standard globe.

A sample is placed in the sample chamber, and the inner space of the apparatus is substituted with helium gas by flowing helium gas for 2 hours through the helium gas introduction pipe for the sample chamber, the connection pipe and the helium gas discharge pipe for the expansion chamber. Then, the valve between the sample chamber and the expansion chamber and the valve in the helium gas discharge pipe connected to the expansion chamber are closed (whereby helium gas remains in the expansion chamber at a pressure identical to the environmental pressure). Then, helium gas is introduced through the helium gas introduction pipe connected to the sample chamber up to a pressure of 134 kPa, and then the stop valve in the helium gas introduction pipe is closed. At 5 min. after closing the stop valve, the pressure ($P_1$) in the sample chamber is measured. Then, the valve between the sample chamber and the expansion chamber is opened to transfer the helium gas to the expansion chamber to provide an equal pressure ($P_2$) in the system, which is measured then.

A sample volume ($V_{SAMP}$) is calculated from the following equation.

$$V_{SAMP}=V_{CELL}-V_{EXP}/[(P_1/P_2)-1].$$

Accordingly, when the sample weight is $W_{SAMP}$, the density ($\rho_H$) of the sample is calculated as follows.

$$\rho_H=W_{SAMP}/V_{SAMP}.$$

[H/C]

H/C is obtained from a result of elementary analysis by using a CHN analyzer.

[Volatile content]

The volatile content of a sample pitch is measured according to JIB R7212 wherein the sample is heated at 800° C. for 30 min.

[Softening point]

The softening point of a sample pitch is measured by placing 1 g of a sample pulverized into particles of at most 250 μm in a cylinder having a sectional area of 1 cm² and equipped with a 1 mm-dia. nozzle at its bottom, and the sample is heated at a rate of 6° C./min. under a load of 9.8 N/cm² (=10 kg/cm²). As the temperature increases, the sample particles are softened to provide an increased packing rate, thus showing a volume decrease, which however ceases at or above a certain temperature. On further temperature increase, the sample melts and starts to flow through the nozzle at the cylinder bottom. The temperature at which the volume decrease of the sample ceases is defined as the softening point of the sample. Incidentally, a sample having a high softening point can fail to flow through the nozzle.

Hereinbelow, the present invention will be described more specifically with reference to Examples and Comparative Examples.

EXAMPLE 1

68 kg of a petroleum pitch having a softening point of 210° C., a quinoline-insoluble content of 1 wt. % and an H/C atomic ratio of 0.63, and 32 kg of naphthalene, were placed in a 300 liter-pressure-resistant vessel equipped with stirring blades, melt-mixed under heating at 190° C. and, after being cooled to 80°–90° C., extruded to form an about 500 μm dia.-string-shaped product. Then, the string-shaped product was broken so as to provide a diameter-to-length ratio of about 1.5, and the broken product was charged into an aqueous solution containing 0.53 wt. % of polyvinyl alcohol (saponification degree=88%) and heated to 93° C., followed by stirring for dispersion and cooling to form a slurry of pitch spheres. After removing a major part of water by filtration, the pitch spheres were subjected to extraction with about 6 times by weight of n-hexane to remove the naphthalene in the pitch spheres. The thus-obtained porous spherical pitch was heated to 260° C. in a fluidized bed while passing heated air and held at 260° C. for 1 hour to be oxidized into a thermally-infusible porous spherical oxidized pitch product. The oxidized pitch product showed an oxygen content of 17 wt. %. Then, the oxidized pitch was heated to 600° C. in a nitrogen gas atmosphere (normal pressure) and held at 600° C. for 1 hour for pre-calcination to obtain a carbon precursor having a volatile content of at most 2%. The carbon precursor was pulverized into a powdery carbon precursor having an average particle size of 25 μm. Then, the powdery carbon precursor was charged in a vacuum calcination furnace and the interior thereof was aerated with nitrogen. The temperature was raised while introducing a small amount of nitrogen and, when the temperature reached 800° C., the system was evacuated by a vacuum pump to keep a pressure of 0.01–0.03 Pa in the vacuum furnace. The temperature was further raised up to 1200° C., and a main calcination was performed by holding at 1200° C., followed by cooling to provide a powdery carbonaceous material.

The properties of the resultant carbonaceous material are shown in Table 1 appearing hereinafter.

EXAMPLE 2

A carbonaceous material was prepared in the same manner as in Example 1 except that the porous spherical pitch was oxidized at 200° C. to provide an oxidized pitch having an oxygen content of 10 wt. %.

The properties of the resultant carbonaceous material are also shown in Table 1.

EXAMPLES 3 AND 4

Carbonaceous materials were prepared in the same manner as in Example 1 except that the main calcination temperature was changed to 1000° C. (Example 3) and 1250° C. (Example 4), respectively.

The properties of the resultant carbonaceous materials are also shown in Table 1.

EXAMPLES 5 AND 6

Carbonaceous materials were prepared in the same manner as in Example 1 except that the pressure within the furnace for the main calcination was changed to 40 Pa (Example 5) and 4000 Pa (Example 6), respectively.

The properties of the resultant carbonaceous materials are also shown in Table 1.

Comparative Example 1

The petroleum pitch used in Example 1 was pulverized to a particle size of below 20 μm. The pulverized pitch in an amount of 200 g was charged in a 1 liter-Kjeldahl flask equipped with an inner projection. While the flask was rotated with an inclination, the flask was heated up to 300° C. at a rate of 100° C./hour while air was flowed thereinto at a rate of 1 liter/min and then held at 300° C. for 1 hour to oxidize the pitch therein. The resultant oxidized pitch showed an oxygen content of 10 wt. %. The oxidized pitch was charged in a vacuum calcination furnace and heated to 1200° C. at a rate of 5° C./min and subjected to a main calcination at 1200° C. for 1 hour while the pressure in the vacuum calcination furnace was held at 0.01–0.03 Pa, thereby obtaining a carbonaceous material.

The properties of the thus-obtained carbonaceous material are also shown in Table 1.

Comparative Example 2

A carbonaceous material was prepared in the same manner as in Example 1 except that the main calcination was performed at a reduced pressure of 40 kPa.

The properties of the thus-obtained carbonaceous material are also shown in Table 1.

Comparative Example 3

The petroleum pitch used in Example 1, without being oxidized, was pre-calcined at 600° C. for 1 hour in a nitrogen gas atmosphere (normal pressure), followed by pulverization to form carbon precursor particles having an average particle size of ca. 20 μm.

The carbon precursor particles were carbonized at 1200° C. under a reduced pressure of 0.01–0.03 Pa to obtain a carbonaceous material, the properties of which are also shown in Table 1.

Reference Example, Comparative Example 4

Carbonaceous materials were prepared in the same manner as in Example 1 except that the main calcination temperature was changed to 800° C. (Reference Example) and 1600° C. (Comparative Example 4), respectively.

Comparative Example 5

To 100 g of furfuryl alcohol, 0.5 g of 85%-phosphoric acid and 10.0 g of water were added, and the resultant mixture was subjected to reaction at 90° C. for 5 hours, followed by gradual addition of 1N-NaOH aqueous solution to adjust the pH to ca. 5. From the reaction mixture, residual water and non-reacted alcohol were distilled off to recover a furfuryl alcohol pre-condensation product, which was subjected to heating at 150° C. for 16 hours of curing to obtain a furan resin.

The thus-obtained furan resin was coarsely pulverized and pre-calcined at 500° C. for 1 hour under a nitrogen gas stream (normal pressure). The pre-calcined product was pulverized to an average particle size of ca. 20 μm and carbonized at 1100° C. for 1 hour in a nitrogen gas atmosphere (normal pressure) to obtain a carbonaceous material.

The properties of the carbonaceous material are also shown in Table 1.

Comparative Example 6

A mixture of 108 g of ortho-cresol, 32 g of paraformaldehyde, 242 g of ethyl cellosolve and 10 g of sulfuric acid was subjected to 3 hours of reaction at 115° C., followed by addition of 17 g of sodium carbonate and 30 g of water to neutralize the reaction liquid. The resultant reaction liquid was charged to 2 liter of water under stirring at a high speed to obtain a novolak resin. Then, 17.3 g of the novolak resin and 2.0 g of hexamethylenetetramine were kneaded at 120° C., and then heated at 250° C. for 2 hours to form a cured resin. The cured resin was coarsely pulverized, pre-calcined at 600° C. for 1 hour in a nitrogen gas atmosphere (normal pressure) and then heated at 1900° C. for 1 hour in an argon gas atmosphere (normal pressure) to obtain a carbonaceous material, which was further pulverized to an average particle size of 15 μm.

The properties of the carbonaceous material are also shown in Table 1.

Comparative Example 7

Flaky natural graphite produced in Madagascar ("CP", available from Nippon Kokuen Shoji K.K.) was used for evaluation. The natural graphite had a fixed carbon content of 97%, ash of 2%, a volatile content of 1% and an average particle size of 7 μm.

The properties thereof are also shown in Table 1.

[Doping/de-doping capacity for active substance]

The carbonaceous materials obtained in Examples and Comparative Examples were respectively used to prepare a non-aqueous solvent-type secondary battery (cell) and the performances thereof were evaluated in the following manner.

The carbonaceous material of the present invention is generally suited for constituting a negative electrode of a non-aqueous solvent secondary battery. However, in order to accurately evaluate the performances of a carbonaceous material inclusive of a doping capacity (A) and a de-doping capacity (B) for a cell active substance and also an amount of the cell active substance remaining in the carbonaceous material without being dedoped ("irreversible capacity" (A-B)) without being affected by a fluctuation in performance of a counter electrode material, a large excess amount of lithium metal showing a stable performance was used as a negative electrode, and each carbonaceous material prepared above was used to constitute a positive electrode, thereby forming a lithium secondary battery, of which the performances were evaluated.

More specifically, the positive electrode was prepared as follows. That is, 90 wt. parts of the carbonaceous material thus formulated in the form of fine particles and 10 wt. parts of polyvinylidene fluoride were mixed together with N-methyl-2-pyrrolidone to form a paste composite, which was then applied uniformly onto a copper foil. The composite, after being dried, was peeled off the copper foil and stamped into a 21 mm-dia. disk. The disk was then press-bonded onto a 21 mm-dia. circular shaped net of stainless steel to form a positive electrode containing about 40 mg of the carbonaceous material. On the other hand, a negative electrode was prepared by stamping a 1 mm-thick sheet of lithium metal into a 21 mm-dia. disk.

The thus-prepared positive and negative electrodes were disposed opposite to each other with a porous polypropylene film as a separator disposed therebetween, and the resultant structure was dipped in an electrolytic solution comprising a 1:1 (by volume)-mixture solvent of propylene carbonate and dimethoxyethane and $LiClO_4$ dissolved therein at a rate of 1 mol/liter, thereby forming a non-aqueous solvent-type lithium secondary battery.

In the lithium secondary battery thus constituted, the carbonaceous material in the positive electrode was subjected to doping and dedoping of lithium to evaluate capacities therefor.

More specifically, the doping was effected by repeating a cycle including 1 hour of current conduction at a current density of 0.5 $mA/cm^2$ and 2 hours of pause until the equilibrium potential between the positive and negative electrodes reached 5 mV. The electricity thus flowed was divided by the weight of the carbonaceous material to provide a doping capacity (A) in terms of mAh/g. Then, in a similar manner, a current was flowed in a reverse direction to dedope the lithium from the doped carbonaceous material. The de-doping was effected by repeating a cycle including 1 hour of current conduction at a current density of 0.5 $mA/cm^2$ and 2 hours of pause, down to a cut-off voltage of 1.5 volts. The electricity thus flowed was divided by the weight of the carbonaceous material to provide a dedoping capacity (B) in terms of mAh/g. Then, an irreversible capacity (A-B) was calculated as a difference between the doping capacity (A) and the dedoping capacity (B), and a discharge efficiency (%) was obtained by dividing the dedoping capacity (B) with the doping capacity (A) and multiplying the quotient (B/A) with 100. The discharge efficiency is a measure of effective utilization of the active substance.

The performances of the lithium secondary batteries using positive electrodes of the respective carbonaceous materials measured in the above-described manner are summarized in the following Table 2.

In view of Table 2, it is understood that the secondary batteries prepared by using the carbonaceous materials according to Examples 1–6 of the present invention showed larger values in both doping capacity (A) and de-doping capacity (B) compared with the batteries prepared by using the carbonaceous materials of Comparative Examples 1–6.

The carbonaceous material of Reference Example showed large lithium-doping and -dedoping capacities which are suitable for a carbonaceous material for a high energy secondary battery but also showed large irreversible capacities, i.e., large quantities of lithium remaining in carbonaceous materials without being dedoped, which are not desirable for effective utilization of lithium.

Incidentally, the secondary battery prepared by using the natural graphite of Comparative Example 7 caused decomposition of the electrolytic solution, thus failing to effect lithium doping.

TABLE 1

| | | Main calcination | | | | | | | |
|---|---|---|---|---|---|---|---|---|---|
| Example | Raw material | Temp. °C. | Atmosphere Pa | $d_{002}$ nm | $L_{c(002)}$ nm | $\rho_B$ g/cm$^3$ | $\rho_H$ g/cm$^3$ | $\rho_H/\rho_B$ | H/C |
| Ex. 1 | Pitch | 1200 | 0.02 | 0.380 | 1.2 | 1.51 | 2.02 | 1.34 | 0.04 |
| 2 | Pitch | 1200 | 0.02 | 0.379 | 1.2 | 1.55 | 1.93 | 1.25 | 0.03 |
| 3 | Pitch | 1000 | 0.02 | 0.39 | 1.0 | 1.53 | 2.05 | 1.34 | 0.05 |
| 4 | Pitch | 1250 | 0.02 | 0.376 | 1.3 | 1.53 | 1.98 | 1.29 | 0.02 |
| 5 | Pitch | 1100 | 40 | 0.384 | 1.1 | 1.50 | 1.97 | 1.31 | 0.05 |
| 6 | Pitch | 1200 | 4000 | 0.380 | 1.2 | 1.51 | 1.97 | 1.30 | 0.04 |
| Ref. Ex. | Pitch | 800 | 0.02 | 0.407 | 0.9 | 1.45 | 1.84 | 1.27 | 0.12 |
| Comp. Ex. 1 | Pitch | 1200 | 0.02 | 0.375 | 1.2 | 1.63 | 1.82 | 1.12 | 0.04 |
| 2 | Pitch | 1200 | 40000 | 0.379 | 1.2 | 1.52 | 1.71 | 1.12 | 0.04 |
| 3 | Pitch | 1200 | 0.02 | 0.355 | 2.1 | 1.96 | 2.02 | 1.03 | 0.03 |
| 4 | Pitch | 1600 | 0.02 | 0.370 | 1.5 | 1.54 | 1.57 | 1.02 | 0.02 |
| 5 | Furfuryl alcohol | 1100 | $N_2$ normal press. | 0.386 | 1.1 | 1.47 | 1.51 | 1.03 | 0.05 |
| 6 | Phenol | 1900 | Ar normal press. | 0.368 | 1.5 | 1.54 | 1.57 | 1.02 | 0.04 |
| 7 | Natural graphite | | | 0.336 | >100 | 2.26 | 2.26 | 1.00 | |

TABLE 2

Cell performances

| Example | Doping capacity (A) (mAh/g) | Dedoping capacity (B) (mAh/g) | Irreversible capacity (A-B) (mAh/g) | Discharge efficiency (B/A) × 100 (%) |
|---|---|---|---|---|
| Example 1 | 605 | 499 | 106 | 82.5 |
| 2 | 554 | 469 | 85 | 84.7 |
| 3 | 756 | 548 | 209 | 72.5 |
| 4 | 526 | 453 | 73 | 86.1 |
| 5 | 550 | 445 | 125 | 80.9 |
| 6 | 530 | 425 | 105 | 80.2 |
| Ref.Example | 951 | 546 | 405 | 57.4 |
| Comp.Ex. 1 | 433 | 361 | 72 | 83.4 |
| 2 | 416 | 326 | 90 | 78.4 |
| 3 | 336 | 278 | 58 | 82.7 |
| 4 | 226 | 192 | 34 | 85.0 |
| 5 | 445 | 321 | 124 | 72.1 |
| 6 | 247 | 167 | 80 | 67.6 |
| 7 | Not measurable | | | |

As described above, according to the present invention, it is possible to provide a carbonaceous material suitable for constituting an electrode of a non-aqueous solvent-type secondary battery having large capacities for doping and dedoping of a cell active substance by controlling the microtexture of the carbonaceous material. If the carbonaceous material is used to constitute a negative electrode of, e.g., a lithium secondary battery, it is possible to provide a secondary battery of a high energy density having a high lithium utilization efficiency.

What is claimed is:

1. A carbonaceous electrode material for a non-aqueous solvent-type secondary battery, comprising a carbonaceous material having an average (002)-plane spacing of at least 0.365 nm according to X-ray diffraction method and characterized by a ratio $\rho_H/\rho_B$ of at least 1.15 wherein $\rho_H$ denotes a density measured by using helium gas as a substitution medium and $\rho_B$ denotes a density measured by using butanol as a substitution medium.

2. A carbonaceous electrode material according to claim 1, wherein the carbonaceous material further shows a hydrogen/carbon atomic ratio H/C of at most 0.1.

3. A carbonaceous electrode material according to claim 1, wherein the ratio $\rho_H/\rho_B$ is at least 1.20.

4. A carbonaceous electrode material according to claim 1, wherein $\rho_B$ is at most 1.70 g/cm$^3$.

5. A carbonaceous electrode material according to claim 1, wherein said carbonaceous material has a crystallite size in a c-axis direction of at most 15 nm as measured by X-ray diffraction method.

6. An electrode structure for a non-aqueous solvent-type secondary battery, comprising: an electroconductive substrate and a composite electrode layer disposed on at least one surface of the electroconductive substrate;

said composite electrode layer comprising a carbonaceous electrode material according to any one of claims 1–5 in a particulate form, and a binder.

7. A non-aqueous solvent-type secondary battery, comprising, a positive electrode, a negative electrode, and a separator and a non-aqueous electrolytic solution disposed between the positive and negative electrodes;

at least one of said positive and negative electrodes comprising an electrode structure according to claim 6.

8. A secondary battery according to claim 7, wherein the electrode structure constitutes the negative electrode.

9. A process for producing a carbonaceous electrode material for a non-aqueous solvent-type secondary battery, comprising the steps of:

mixing a pitch of a petroleum or coal origin with an additive comprising an aromatic compound having two or three aromatic rings and a boiling point of at least 200° C. to form a shaped pitch product, extracting the additive from the shaped pitch product with a solvent having a low dissolving power for the pitch and a high dissolving power for the additive, thereby producing a porous pitch product, oxidizing the porous pitch product, and calcining the oxidized porous pitch product at a temperature of 900°–1500° C. under a reduced pressure of at most 10 kPa to produce a carbonaceous electrode material having an average (002)-plane spacing of at least 0.365 nm as measured by an X-ray diffraction method and characterized by a ratio $\rho_H/\rho_B$ of at least 1.15 wherein $\rho_H$ denotes a density measured by using helium gas as a substitution medium and $\rho_B$ denotes a density measured by using butanol as a substitution medium.

10. A process according to claim 9, wherein said porous pitch product is oxidized with an oxygen-containing gas having an oxygen content of 5–30%.

11. A process according to claim 9, wherein said porous pitch product is oxidized with an oxygen-containing gas so as to provide an oxidized porous pitch product having an oxygen content of 10–25%.

* * * * *